(12) United States Patent
Seo et al.

(10) Patent No.: US 11,383,423 B2
(45) Date of Patent: Jul. 12, 2022

(54) VACUUM THERMOFORMING APPARATUS AND METHOD FOR MANUFACTURING DISPLAY DEVICE USING THE SAME

(71) Applicant: Samsung Display Co., Ltd., Yongin-si (KR)

(72) Inventors: Hyunseung Seo, Gwacheon-si (KR); Jonghwan Cho, Ansan-si (KR); Jihyun Ko, Bucheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 321 days.

(21) Appl. No.: 16/654,218

(22) Filed: Oct. 16, 2019

(65) Prior Publication Data

US 2020/0215741 A1    Jul. 9, 2020

(30) Foreign Application Priority Data

Jan. 4, 2019   (KR) ........................ 10-2019-0001382

(51) Int. Cl.
*B29C 51/18*    (2006.01)
*B29C 51/10*    (2006.01)
*B29L 31/34*    (2006.01)

(52) U.S. Cl.
CPC .............. *B29C 51/18* (2013.01); *B29C 51/10* (2013.01); *B29L 2031/3475* (2013.01)

(58) Field of Classification Search
None
See application file for complete search history.

(56) References Cited

U.S. PATENT DOCUMENTS 9,963,374 B2   5/2018   Jouanno et al.

FOREIGN PATENT DOCUMENTS

| KR | 10-2010-094290 | 8/2010 |
| KR | 10-2016-0003706 | 1/2016 |
| KR | 10-2016-0030481 | 3/2016 |
| KR | 10-1736564 | 5/2017 |

*Primary Examiner* — Monica A Huson
(74) *Attorney, Agent, or Firm* — H.C. Park & Associates, PLC

(57) ABSTRACT

A vacuum thermoforming apparatus including: a molding machine on which a window base material is mounted; and a pressure supply machine coupled to the molding machine and configured to supply a pneumatic pressure toward the molding machine. The molding machine includes a mounting part having a curved surface-shaped mounting surface, and a coupling part having a structure for coupling with the pressure supply machine and a curved portion along the shape of the mounting part. The pressure supply machine includes: a cover part facing the mounting surface; and a side wall extending from the cover part to define an inner space in the pressure supply machine, the side wall having a curved upper surface so as to engage with the coupling part.

23 Claims, 16 Drawing Sheets

VACUUM THERMOFORMING APPARATUS AND METHOD FOR MANUFACTURING DISPLAY DEVICE USING THE SAME

CROSS-REFERENCE TO RELATED APPLICATION

This application claims priority from and the benefit of Korean Patent Application No. 10-2019-0001382, filed on Jan. 4, 2019, which is hereby incorporated by reference for all purposes as if fully set forth herein.

BACKGROUND

Field

Exemplary embodiments of the invention relate generally to a vacuum thermoforming apparatus and a method for manufacturing a display device using the same, and more specifically to, a vacuum thermoforming apparatus which is capable of improving reliability of manufacturing a curved window, and a method for manufacturing a display device using the same.

Discussion of the Background

Electronic devices, such as smartphones, tablets, laptop computers, car navigation units, game machines, electronic audio devices, smart watches, cameras, and smart televisions, have been developed. Such electronic devices are provided with display devices for providing information. Electronic devices have various electronic modules aside from display devices.

Recently, not only display devices which are provided with flexible display modules and may thereby be folded or rolled, but also display devices bent in various shapes have been developed. The flexible display devices having variously changeable shapes may be easily carried and improve convenience of users. Furthermore, when display devices are provided to be bent or curved in a desired shape according to the shapes of products on which the display devices are mounted, the display devices are easily applicable to products and it is possible to plan various designs.

The above information disclosed in this Background section is only for understanding of the background of the inventive concepts, and, therefore, it may contain information that does not constitute prior art.

SUMMARY

Devices constructed according to exemplary embodiments of the invention are capable of providing a vacuum thermoforming apparatus capable of improving manufacturing reliability of a curved window.

Methods according to exemplary embodiments of the invention also provide a method for manufacturing a display device provided with a curved window by using the vacuum thermoforming apparatus.

Additional features of the inventive concepts will be set forth in the description which follows, and in part will be apparent from the description, or may be learned by practice of the inventive concepts.

One or more exemplary embodiments of the inventive concepts provides a vacuum thermoforming apparatus including: a molding machine on which a window base material is mounted; and a pressure supply machine coupled to the molding machine and configured to supply a pneumatic pressure toward the molding machine, wherein the molding machine includes: a mounting part having a curved surface-shaped mounting surface; and a coupling part having a structure for coupling with the pressure supply machine and a curved portion along the shape of the mounting part, and the pressure supply machine includes: a cover part facing the mounting surface; and a side wall extending from the cover part to define an inner space in the pressure supply machine, the side wall including a curved upper surface so as to engage with the coupling part.

In an exemplary embodiment, the coupling part may include: a facing surface facing the upper surface of the side wall; and a fixing groove provided in a shape recessed from the facing surface.

In an exemplary embodiment, the facing surface may have a curved surface shape along the shape of the mounting part.

In an exemplary embodiment, a depth of the fixing groove recessed from the facing surface may be constant.

In an exemplary embodiment, the pressure supply machine may further include a protrusion part protruding from the upper surface of the side wall and inserted into the fixing groove.

In an exemplary embodiment, the mounting surface may have a curved surface shape curved in an "S" shape.

In an exemplary embodiment, the pressure supply machine may be provided with a supply hole through which the pneumatic pressure is supplied.

In an exemplary embodiment, the molding machine may be provided with a vacuum suction hole for fixing the window base material using a vacuum suction method.

In an exemplary embodiment, the vacuum suction hole may be provided at least between the coupling part and the mounting part or in the coupling part.

In an exemplary embodiment, at least one of the molding machine or the pressure supply machine may be made of a metal material.

In an exemplary embodiment of the inventive concepts, a vacuum thermoforming apparatus includes: a molding machine on which a window base material including a plurality of effective regions defined therein is mounted; and a pressure supply machine coupled to the molding machine and configured to supply a pneumatic pressure toward the molding machine.

The molding machine may include: a mounting part having a plurality of mounting surfaces corresponding to the plurality of effective regions, the mounting surfaces each having a curved surface shape; and a coupling part having a structure for coupling with the pressure supply machine and a curved portion along the shape of the mounting part, and the pressure supply machine includes: a cover part facing the mounting surfaces; and a side wall extending from the cover part to define an inner space in the pressure formed, the side wall including a curved upper surface so as to engage with the coupling part.

In an exemplary embodiment, the molding machine may further include a connection part provided between two mounting surfaces adjacent to each other among the plurality of mounting surfaces and configured to connect the two mounting surfaces.

In an exemplary embodiment, the coupling part may be provided with a sub-fixing groove for coupling with the pressure supply machine.

In an exemplary embodiment, the pressure supply machine may further include: an inner side wall provided at a position corresponding to the connection part; and an inner protrusion part protruding from an upper surface of the inner side wall and coupled to the sub-fixing groove.

In an exemplary embodiment, the coupling part may include: a facing surface having a curved surface shape along the shape of the mounting part, and facing the pressure supply machine; and a fixing groove provided in a shape recessed a constant depth from the facing surface.

In an exemplary embodiment, the pressure supply machine may be provided with a supply hole through which the pneumatic pressure is supplied, and the supply hole is provided corresponding to one or more effective regions.

In an exemplary embodiment, the molding machine may further include a vacuum suction hole for fixing the window base material using a vacuum suction method.

In an exemplary embodiment of the inventive concepts, a method for manufacturing a display device using a vacuum thermoforming apparatus including a molding machine including a mounting part having a curved surface-shaped mounting surface and a coupling part provided in a curved shape along the shape of the mounting part; and a pressure supply machine coupled to the molding machine.

One or more exemplary embodiments of the inventive concepts may provide a method for manufacturing a display device that includes: heating a window base material; mounting the heated window material on the mounting part; coupling the pressure supply machine and the molding machine; supplying a pneumatic pressure toward the mounting part through the pressure supply machine to bring the window base material into close contact with the mounting surface and deforming a shape of the window base material into the shape of the mounting surface; cutting the deformed window base material along an effective region and completing a window having a curved surface shape; manufacturing a flexible display module; and attaching the flexible display module to the window and completing a display device.

In an exemplary embodiment, the heating of the window base material may include: clamping the window base material by using a clamping device; and heating the window base material through the clamping device.

In an exemplary embodiment, the clamping device may mount the heated window base material onto the mounting part.

In an exemplary embodiment, the method may further include preheating the mounting part.

In an exemplary embodiment, in the deforming the shape of the window base material, the window base material may be vacuum suctioned through the vacuum suction hole provided in the molding machine and bring the window base material into close contact with the mounting surface.

In an exemplary embodiment, the window base material may be made of a plastic material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
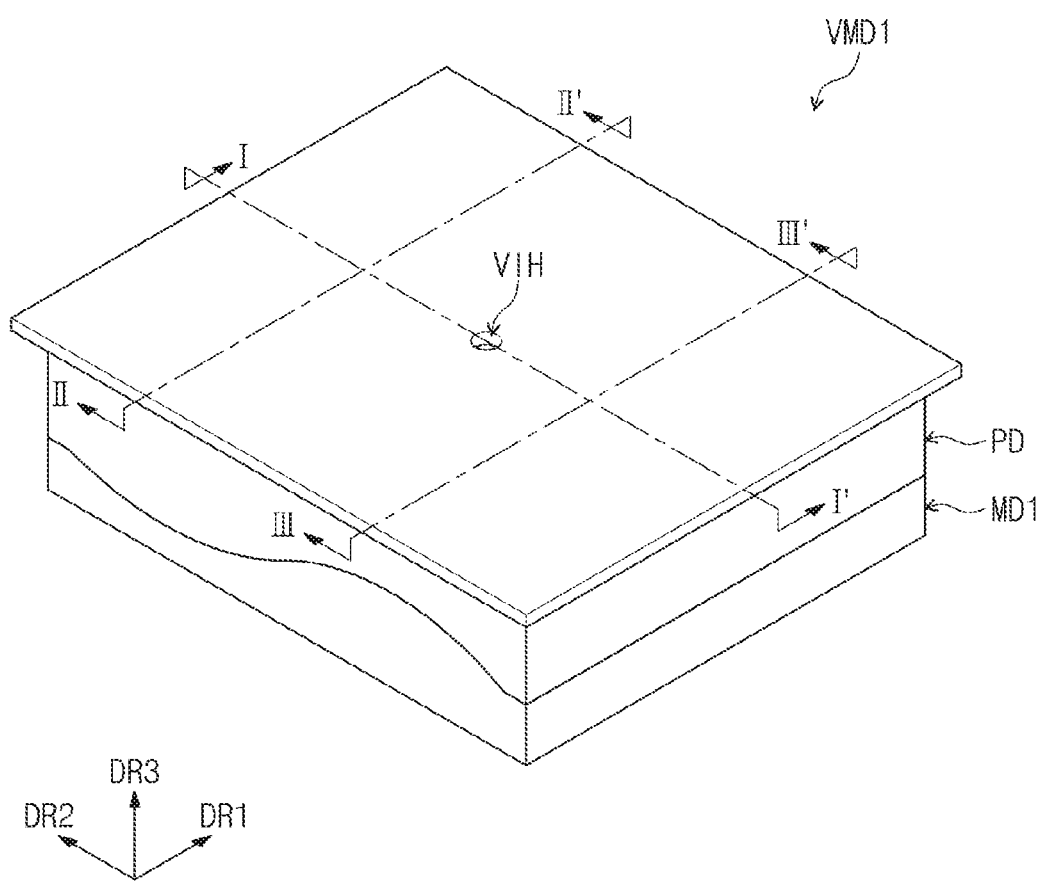
FIG. 1 is a perspective view of a coupled vacuum thermoforming apparatus according to an exemplary embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc.

(hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z—axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
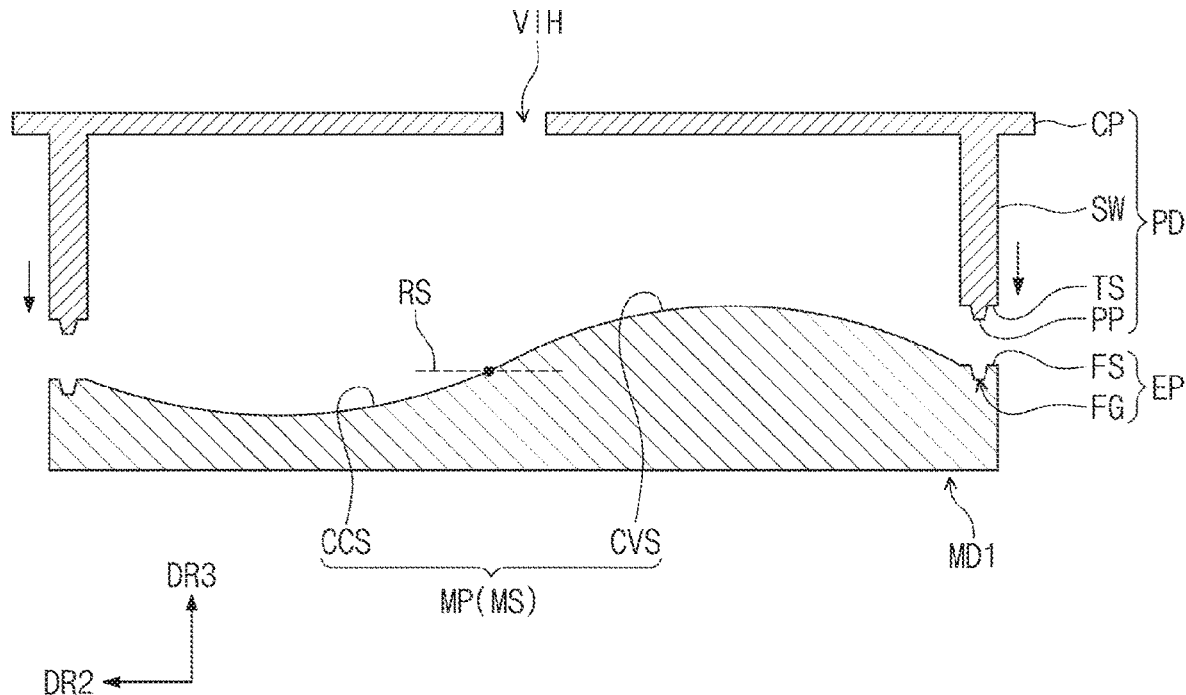
FIG. 2A is a cross-sectional view showing a pre-coupling state of the vacuum thermoforming apparatus shown in FIG. 1.
Figure 2B:
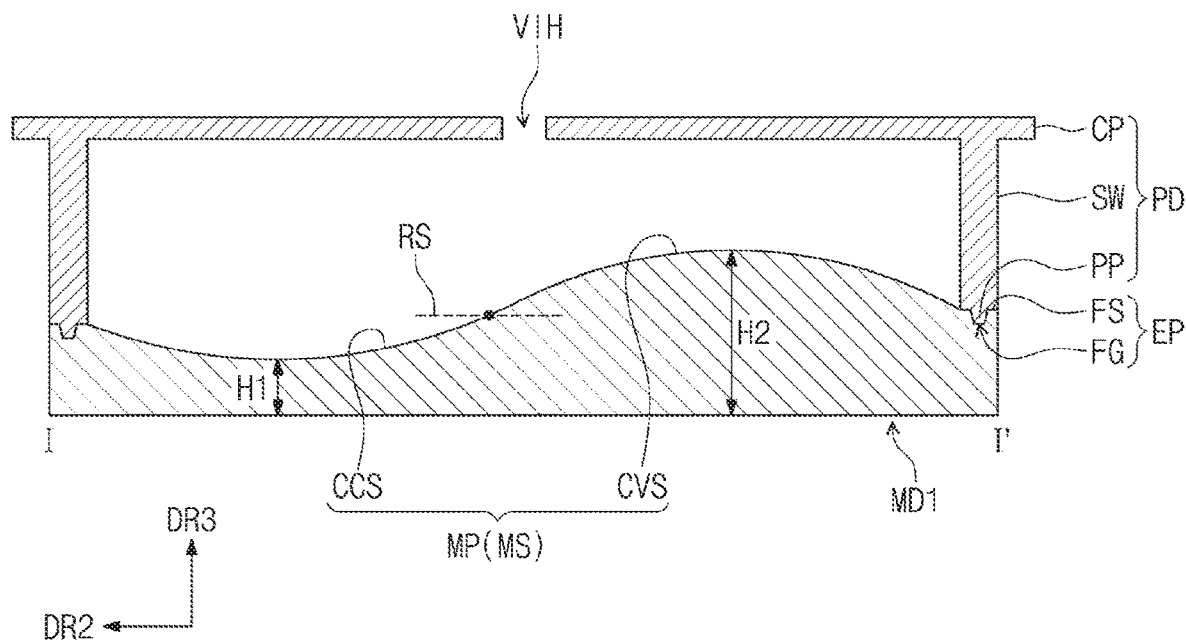
FIG. 2B is a cross-sectional view of the coupled vacuum thermoforming apparatus shown in FIG. 1 taken along cut line I-I'.

FIG. 1 is a perspective view of a coupled vacuum thermoforming apparatus according to an exemplary embodiment of the inventive concepts. FIG. 2A is a cross-sectional view showing a pre-coupling state of the vacuum thermoforming apparatus shown in FIG. 1. FIG. 2B is a cross-sectional view of the coupled vacuum thermoforming apparatus shown in FIG. 1 taken along cut line I-I'.

Referring to FIGS. 1, 2A and 2B, a vacuum thermoforming apparatus VMD according to an exemplary embodiment includes a molding machine MD1 and a pressure supply machine PD. The vacuum thermoforming apparatus VMD is a forming apparatus for processing a window base material (not shown) into a desired shape.

The vacuum thermoforming apparatus VMD has a structure in which the molding machine MD1 and the pressure supply machine PD are coupled. The vacuum thermoforming apparatus VMD may have a hexahedral shape defined by sides parallel to first to third directions DR1, DR2, and DR3. However, the shape of the vacuum thermoforming apparatus VMD is not limited thereto, and may be modified into various shapes.

In an exemplary embodiment of the inventive concepts, the vacuum thermoforming apparatus VMD may be composed of metal material. The vacuum thermoforming apparatus VMD may heat the window base material at a predetermined temperature (for example, a temperature of at least the glass transition temperature Tg of the window base material) when forming the window base material. Accordingly, both the molding machine MD1 and the pressure supply machine PD may be formed by using a metal material so as to endure such a process temperature.

The molding machine MD1 includes: a mounting part MP having a curved surface-shaped mounting surface MS; and a coupling part EP provided with a coupling structure for coupling with the pressure supply machine PD. A window base material (not shown) is mounted on the mounting part MP so as to face the mounting surface MS. The mounting surface MS may be formed in a size corresponding to an effective region of the window base material. Here, the effective region may be a region used as a window.

The mounting surface MS may have an overall curved surface shape or have a curved surface shape only at a partial region thereof. FIG. 2A shows, as an example, a structure in which the entire mounting surface MS is curved, but exemplary embodiments of the inventive concepts are not limited thereto. That is, the mounting surface MS may have partially curved structure.

For example, when the window to be manufactured has an overall curved surface shape, the entirety of the mounting surface MS may have a curved structure. However, when the window to be manufactured has a partial curved surface shape, the mounting surface MS may have a structure curved corresponding to the curved surface portion of the window. That is, the mounting surface MS may have different shapes according to the shape of the window to be manufactured.

In an exemplary embodiment of the inventive concepts, the mounting surface MS may have a shape curved in the second direction DR2. The mounting surface MS may include a concave surface CCS and a convex surface CVS which are continued in the second direction DR2. For convenience of description, a plane passing through an inflection point, at which the concave surface CCS and the convex surface CVS meets, and defined by the first and second directions DR1 and DR2 may be defined as a reference surface RS. The concave surface CCS has a shape recessed from the reference surface RS, and the convex surface CVS has a shape protruding from the reference surface RS.

A first height h1 from the bottom surface of the mounting part MP to the concave surface CCS and a second height h2 from the bottom surface of the mounting part MP to the convex surface CVS may be different from each other. That is, the second height h2 may be larger than the first height h1.

The coupling part EP may include: a facing surface FS facing the pressure supply machine PD; and a fixing groove FG provided in a shape recessed from the facing surface FS.

The pressure supply machine PD includes: a cover part CP facing the mounting part MP; and side walls SW extending from the cover part CP. The cover part CP may have a flat plate shape parallel to the plane defined by the first and second directions DR1 and DR2. The cover part CP may be provided with a supply hole VIH for supplying a pneumatic pressure. In an exemplary embodiment of the inventive concepts, a structure provided with a single supply hole VIH in the cover part CP, but exemplary embodiments of the inventive concepts are not limited thereto. That is, one or more supply holes VIH may be provided in the cover part CP.

The side wall SW extends from the cover part CP in the third direction DR3. The side wall SW may be provided in a closed shape so as to define a closed inner space inside the pressure supply machine PD after being coupled with the molding machine MD.

The side wall SW may be disposed so as to engage with the coupling part EP. That is, the top surface TS of the side wall SW has a curved shape corresponding to the coupling part EP so as to tightly engage with the coupling part EP. Accordingly, the inner space between the pressure supply machine PD and the molding machine MD1 may be sealed.

The pressure supply machine PD may further include a protrusion part PP protruding from the upper surface TS of the side wall SW. When the pressure supply machine PD and the molding machine MD1 are coupled, the protrusion part PP may be inserted into the fixing groove FG of the coupling part EP. Accordingly, while the pressure supply machine PD and the molding machine MD1 are coupled, the pressure supply machine PD may be prevented from being easily separated and/or disengaged from the molding machine MD1.

FIGS. 2A and 2B illustrate a structure in which the fixing groove FG is provided in the coupling part EP and the protrusion part PP is provided in the side wall SW of the pressure supply machine PD, but exemplary embodiments of the inventive concepts are not limited thereto. That is, the molding machine MD1 may include the protrusion part protruding from the facing surface FS of the coupling part EP, and the pressure supply machine PD may be provided with the fixing groove recessed from the upper surface TS of the side wall SW so that the fixing groove is engaged and coupled to the protrusion part.

Figure 3A:
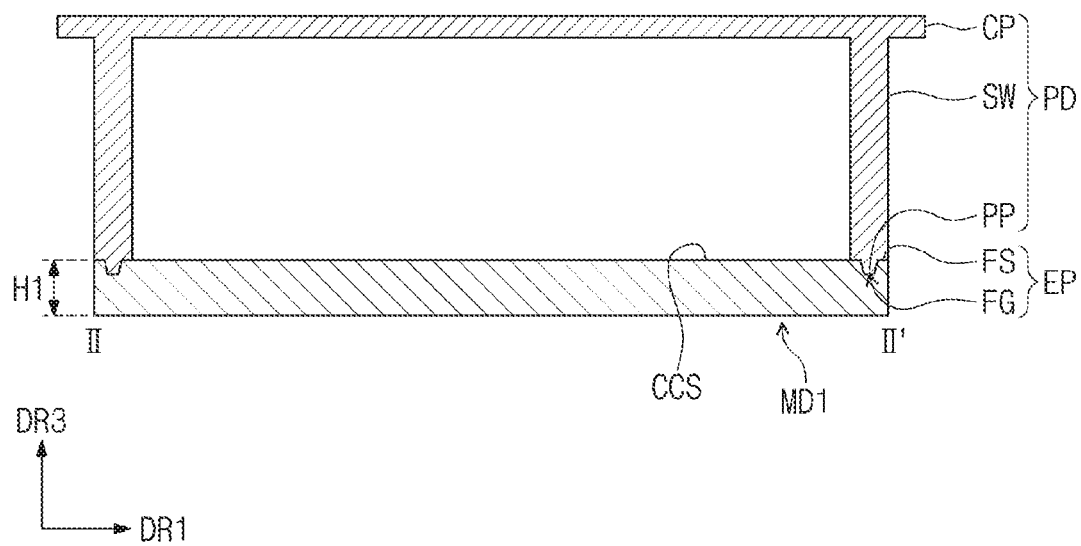
FIG. 3A is a cross-sectional view of the vacuum thermoforming apparatus shown in FIG. 1 taken along cut line II-II'.
Figure 3B:
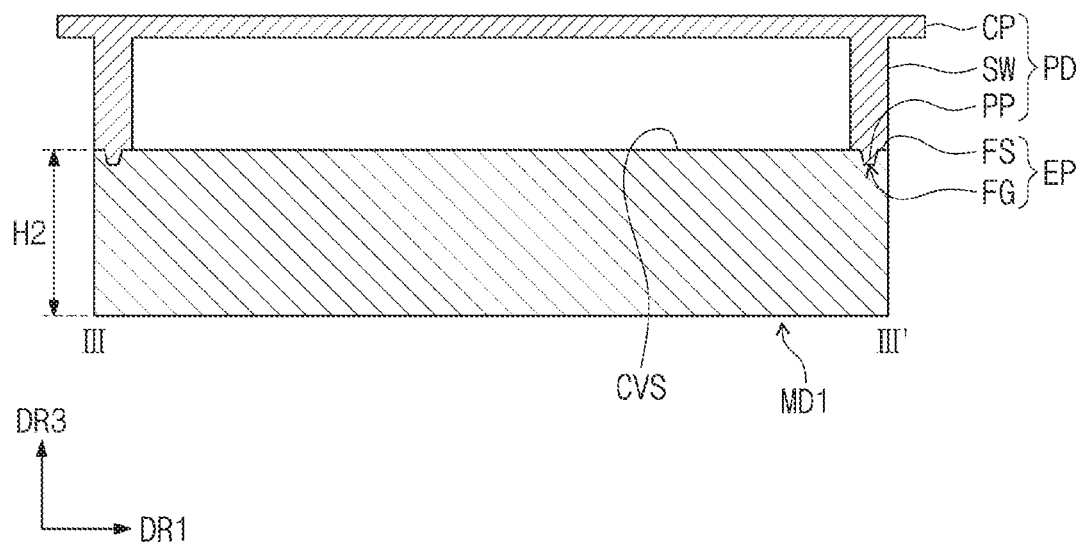
FIG. 3B is a cross-sectional view of the vacuum thermoforming apparatus shown in FIG. 1 taken along cut line III-III'.

FIG. 3A is a cross-sectional view of the vacuum thermoforming apparatus shown in FIG. 1 taken along cut line II-II', and FIG. 3B is a cross-sectional view of the vacuum thermoforming apparatus shown in FIG. 1 taken along cut line III-III'.

Referring to FIGS. 1, 2B, 3A and 3B, the coupling part EP may be provided in a shape curved along the shape the mounting part MP. That is, the height of the coupling part EP may be different according to the position thereof. Here, the height of the coupling part EP may be defined as the height of the upper surface (that is, the facing surface FS) of the coupling part EP from the bottom surface thereof.

In particular, as in an exemplary embodiment of the inventive concepts, when the mounting surface MS has a shape curved in the second direction DR2, the coupling part EP may have the height corresponding to the height of the mounting surface MS. Meanwhile, in the present embodiment, since the mounting surface MS is not curved in the first direction DR1, the coupling part EP extending in the first direction DR1 may have a constant height.

In an exemplary embodiment of the inventive concepts, the coupling part EP adjacent to the concave surface CCS having the first height h1 may have the first height h1, and the coupling part EP adjacent to the convex surface CVS having the second height h2 may have the second height h2.

FIGS. 1 to 3B illustrate a structure in which the upper surface FS of the coupling part EP is located at substantially the same height as the mounting surface MS, but exemplary embodiments of the inventive concepts are not limited thereto. For example, a height difference may be formed the upper surface of the coupling part EP and the mounting surface MS. However, this height difference may be a height difference of such a degree that does not affect the elongation of the window base material. The allowable range of the height difference may be different according to the material of the window base material.

When a height difference occurs between the upper surface FS of the coupling part EP and the mounting surface MS, an inner surface which connects the coupling part EP and the upper surface FS of the mounting surface MS may be provided in the molding machine MD1. In addition, the depth of the inner surface may become different between the concave portion and the convex portion of the mounting surface MS. In this case, a difference may occur in the elongation of the window base material.

However, according to an exemplary embodiment of the inventive concepts, the coupling part EP may have the substantially the same height as the height of the mounting surface MS. In addition, in another exemplary embodiment, when a height difference is formed between the upper surface FS of the coupling part EP and the mounting surface MS, the size of the height difference may not become different between the concave portion and the convex portion but be constant.

Accordingly, when forming the window base material, a difference in elongation does not occur between the concave portion and the convex portion. Thus, when the window base material is formed by using the vacuum thermoforming apparatus VMD1 according to an exemplary embodiment of the inventive concepts, a window having a uniform thickness may be manufactured.

Figure 4A:
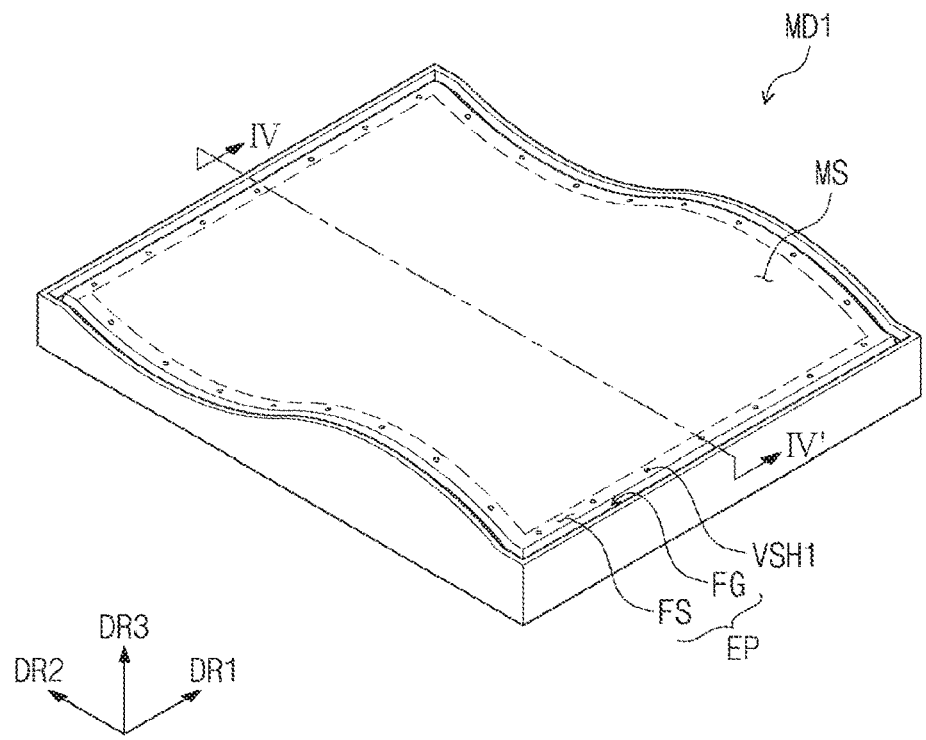
FIG. 4A is a perspective view of a molding machine according to an exemplary embodiment.
Figure 4B:
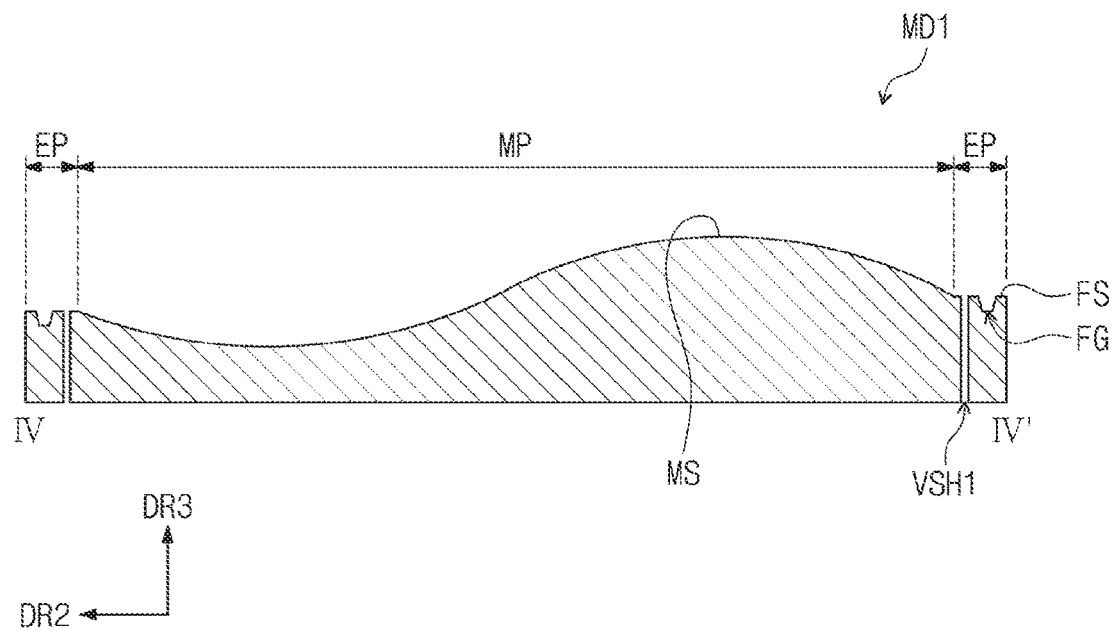
FIG. 4B is a cross-sectional view of the molding machine shown in FIG. 4A taken along cut line IV-IV'.

FIG. 4A is a perspective view illustrating a molding machine according to an exemplary embodiment of the inventive concepts, and FIG. 4B is a cross-sectional view of the molding machine shown in FIG. 4A taken along cut line IV-IV'.

Referring to FIGS. 4A and 4B, a molding machine MD1 according to an exemplary embodiment of the inventive concepts may further include vacuum suction holes VSH1. The vacuum suction holes VSH1 may be provided in either of a mounting part MP and a coupling part EP. In an exemplary embodiment of the inventive concepts, the vacuum suction holes VSH1 are illustrated to be provided in the coupling part EP, but the positions of the vacuum suction holes VSH1 are not limited thereto.

Specifically, in an exemplary embodiment of the inventive concepts, the vacuum suction holes VSH1 may be provided in the upper surface of the coupling part EP. The vacuum suction holes VSH1 may be formed so as to pass through the coupling part EP from the upper surface FS to the bottom surface. The vacuum suction holes VSH1 are provided in plurality and may be disposed to be spaced apart a predetermined distance from each other.

The vacuum suction holes VSH1 are holes for providing a suction force so as to bring a window base material into close contact with a mounting surface MS. Accordingly, in a vacuum thermoforming apparatus VMD1 (shown in FIG. 1), the window base material may be brought into close contact with and fixed to the mounting surface MS by using a vacuum suction method.

FIGS. 4A and 4B illustrate a structure in which the vacuum suction holes VSH1 are provided in cylindrical shapes, but exemplary embodiments of the inventive concepts are not limited thereto. The shapes, number, and sizes of the vacuum suction holes VSH1 may be variously modified according to a designed structure.

Figure 4C:
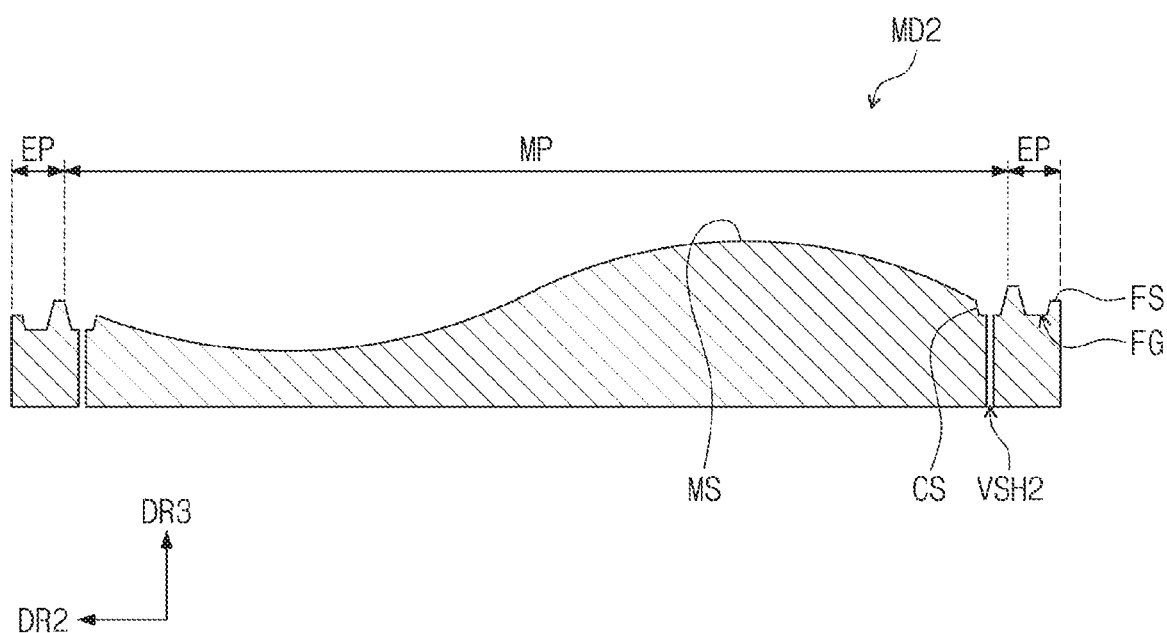
FIG. 4C is a cross-sectional view of a molding machine according to another exemplary embodiment.

FIG. 4C is a cross-sectional view of a molding machine according to another exemplary embodiment of the inventive concepts.

Referring to FIG. 4C, a molding machine MD2 according to another exemplary embodiment of the inventive concepts may further include a connection surface CS provided between the coupling part EP and the mounting part MP. The connection surface CS may be formed so as to have a height difference between the upper surface FS of the coupling part EP and the mounting surface MS.

However, this height difference may be a height difference of such a degree that does not affect the elongation of the window base material. The allowable range of the height difference may be different according to the material of the window base material. In addition, the size of the height difference may not be different between a concave portion and a convex portion of the mounting surface MS.

The molding machine MD2 may include vacuum suction holes VSH2 provided in the connection surface CS. Compared to the vacuum suction holes VSH1, the vacuum suction holes VSH2 differ only in the formation positions thereof and are the same in terms of functions thereof, and therefore specific description on the vacuum suction holes VSH2 will be omitted.

Figure 5A:
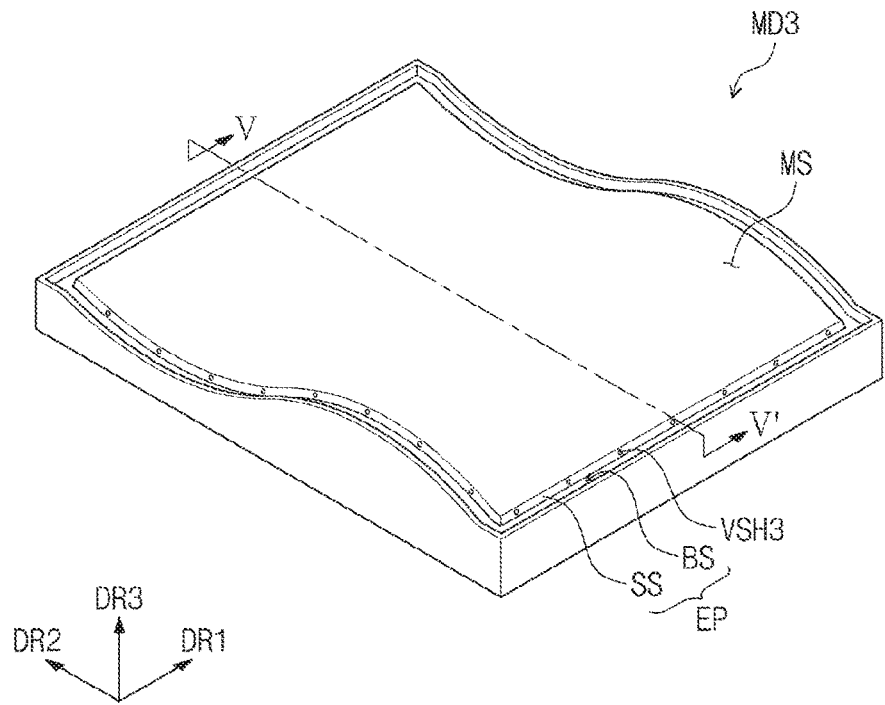
FIG. 5A is a perspective view illustrating a molding machine according to another exemplary embodiment.
Figure 5B:
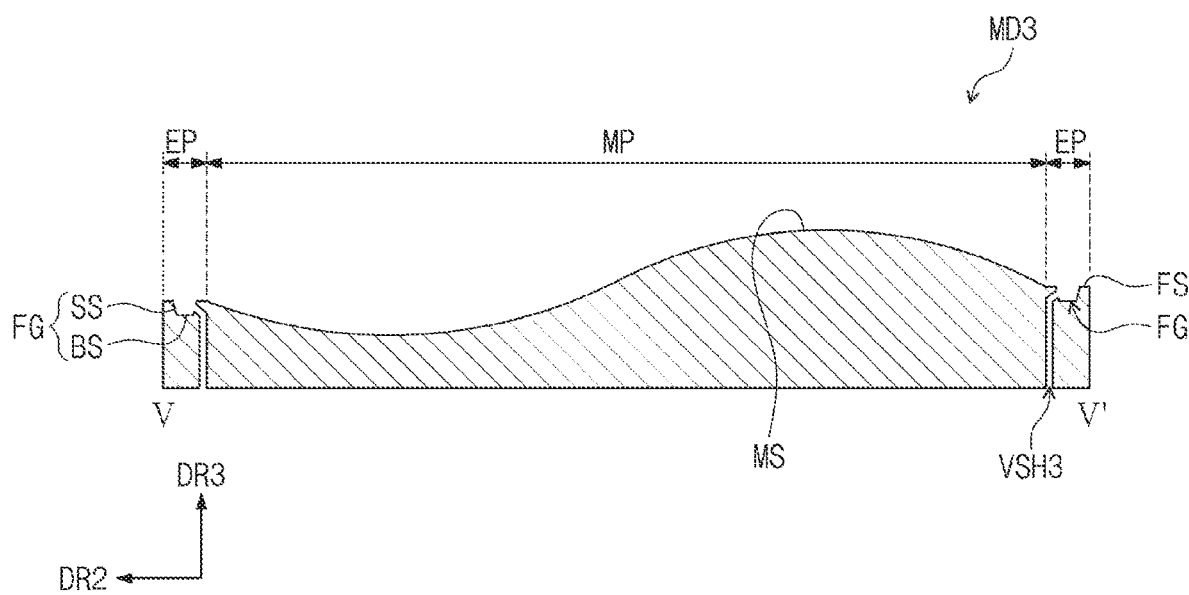
FIG. 5B is a cross-sectional view of the molding machine shown in FIG. 5A taken along cut line V-V'.

FIG. 5A is a perspective view of a molding machine according to another exemplary embodiment of the inventive concepts, and FIG. 5B is a cross-sectional view of the molding machine shown in FIG. 5A taken along cut line V-V'.

Referring to FIGS. 5A and 5B, a molding machine MD3 according to an exemplary embodiment of the inventive concepts may further include vacuum suction holes VSH3 provided in a side surface SS of the coupling part EP. The coupling part EP may be provided with a bottom surface BS and a side surface SS which define a fixing groove FG. Vacuum suction holes VSH3 according to an exemplary embodiment of the inventive concepts may be provided in either of the side surface SS and the bottom surface BS which define the fixing groove FG. FIGS. 5A and 5B illustrate a structure in which the vacuum suction holes VSH3 are provided in the side surface SS, but exemplary embodiments of the inventive concepts are not limited thereto. That is, in another exemplary embodiment of the inventive concepts, the vacuum suction holes VSH3 may be provided in the bottom surface BS.

FIGS. 5A and 5B illustrate a structure in which the vacuum suction holes VSH3 are provided in cylindrical shapes, but exemplary embodiments of the inventive concepts are not limited thereto. The shapes, number, and sizes of the vacuum suction holes VSH3 may be variously modified according to a designed structure.

FIGS. 6A, 6B, 6C, 6D, and 6E are process views showing a manufacturing sequence of a window according to an exemplary embodiment of the inventive concepts.

Figure 6A:
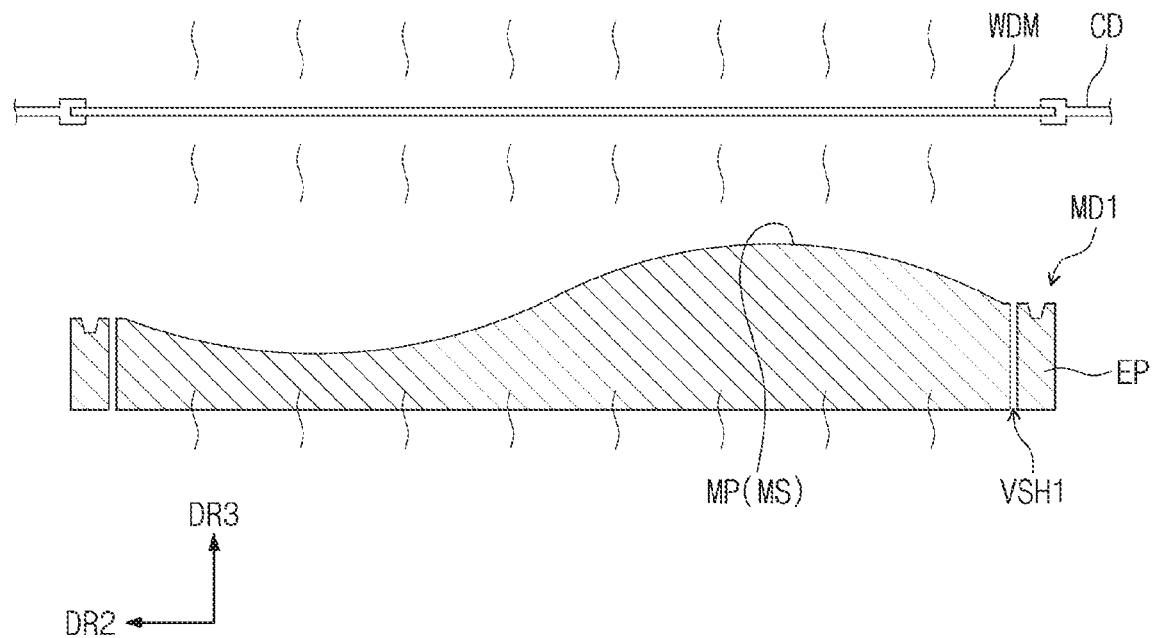
FIGS. 6A, 6B, 6C, 6D, and 6E are process views showing a manufacturing sequence of a window according to an exemplary embodiment.

Referring to FIG. 6A, a prepared window base material WDM may be heated. The window base material WDM according to an exemplary embodiment of the inventive concepts may include a transparent insulating material. The window base material WDM may have flexibility. Accordingly, the window base material WDM may be curved, folded, or rolled.

In an exemplary embodiment of the inventive concepts, a material may be employed as a material of the window base material as long as the material may be bent by controlling the thickness thereof even though the material is rigid. For example, the window base material WDM may include at least any one material among glass, quartz, organic materials, or inorganic materials including silicon oxides ($SiO_x$).

Hereinafter, an exemplary embodiment will be described in which the window base material WDM includes a plastic material such as at least any one of polyimide (PI), polyamide-imide (PAI), polyether ether ketone (PEEK), or polyetherimide (PEI).

Both ends of the prepared window base material WDM may be clamped by a clamping device CD. When the window base material WDM has a rectangular plate shape, the clamping device CD may clamp two mutually facing sides of the window base material WDM.

The clamping device CD may not only clamp and move the window base material WDM but also heat the window base material WDM. That is, the clamping device CD may include a heating means (not shown) for heating the window base material WDM.

In another exemplary embodiment, a heating device (not shown) for heating the window base material WDM may be provided separately from the clamping device CD. In this case, the clamping device CD may only function to move the window base material WDM.

As shown in FIG. 6A, the molding machine MD1 may be preheated at a predetermined temperature. A heating unit (not shown) may be provided in the mounting part MP of the molding machine MD1. Accordingly, before the window base material WDM is mounted on the mounting part MP, the heating unit may preheat the mounting part MP at a predetermined temperature.

The heating temperature range of the window base material WDM and the preheat temperature range of the mounting part MP may be different according to the material of the window base material WDM. For example, when the window base material WDM is composed of the above-mentioned plastic material, the heating temperature of the window base material WDM may be the glass transition temperature of the plastic material, that is, a temperature of about 140° C. to about 160° C. However, when the window base material WDM is composed of a glass material, the heating temperature of the window base material WDM may be the glass transition temperature Tg of the glass material, that is, a temperature of about 600° C.

That is, in the heating step, even when the window base material WDM is formed of any material, the window base material WDM may be heated so as to be soft.

Figure 6B:
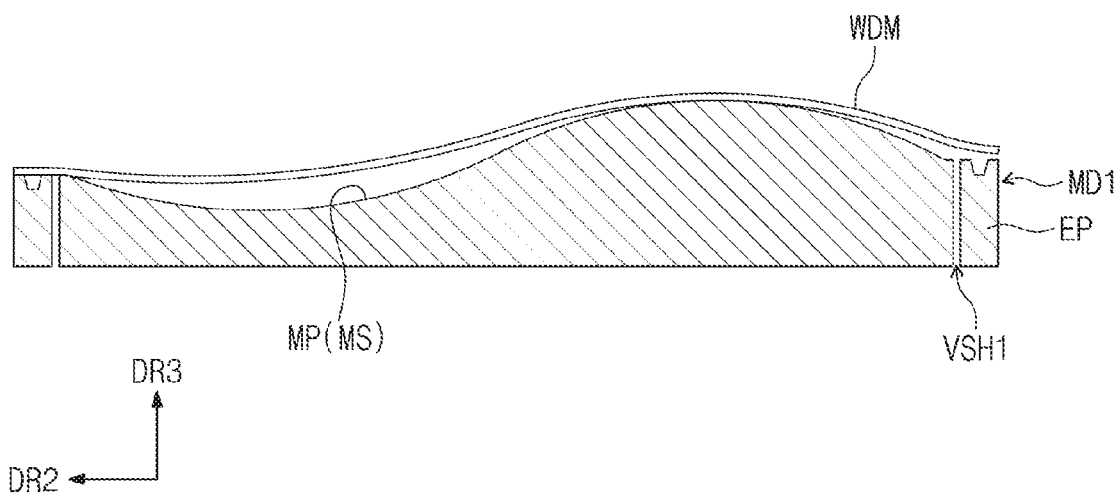

Next, referring to FIG. 6B, the window base material WDM heated to be soft is mounted on the mounting part MP. Even when the window base material WDM become soft by the heating step, the window base material WDM mounted on the mounting part MP may not be completely brought into close contact with the curved surface-shaped mounting surface MS.

Figure 6C:
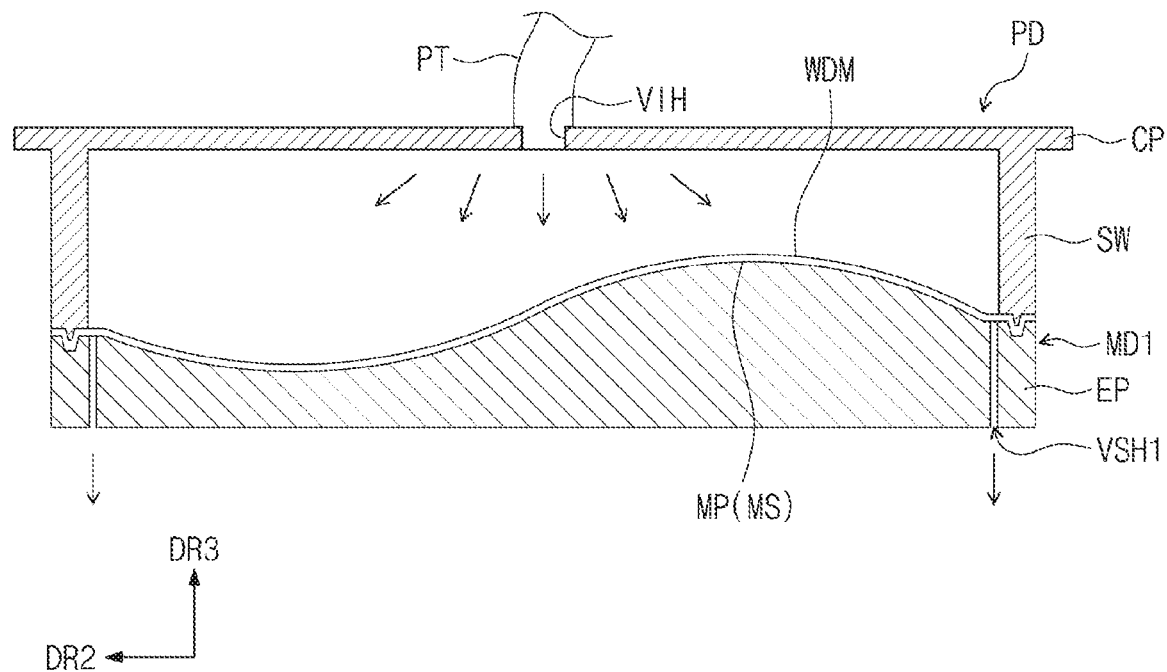

Next, as shown in FIG. 6C, a pressure supply machine PD and a molding machine MD1 are coupled. When the pressure supply machine PD and the molding machine MD1 are coupled, a protrusion part PP (shown in FIG. 2A) provided on a side wall SW of the pressure supply machine PD is inserted into a fixing groove FG (shown in FIG. 2A) provided in a coupling part EP of the above-mentioned molding machine MD1. Accordingly, the pressure supply machine PD and the molding machine MD1 are engaged and coupled, so that the phenomenon in which the pressure supply machine PD is easily separated and/or disengaged from the molding machine MD1 may be prevented.

When the pressure supply machine PD and the molding machine MD1 are coupled, a vacuum thermoforming apparatus VMD1 is completed, and a vacuum space may be provided inside the vacuum thermoforming apparatus VMD1. A supply hole VIH of the pressure supply machine PD is connected to a pressure supply tube PT and may supply a pneumatic pressure to the vacuum space. The window base material WDM may be brought into close contact with the mounting surface MS by the pneumatic pressure.

In addition, the vacuum thermoforming apparatus VMD1 may further bring the window base material WDM into close contact with the mounting surface MS by using a vacuum suction method through the vacuum suction holes VSH1 provided in the molding machine MD1.

As such, when the window base material WDM is brought into close contact with the mounting surface MS, the shape of the window base material WDM may be changed into the shape of the mounting surface MS.

The window base material WDM may be cooled and cured so as to maintain the changed shape. The cooling and curing processes may be performed inside the vacuum thermoforming apparatus VMD1. However, exemplary embodiments of the inventive concepts are not limited thereto. That is, the window base material WDM is separated from the vacuum thermoforming apparatus VMD1, and then the cooling and curing steps may be performed.

Figure 6D:
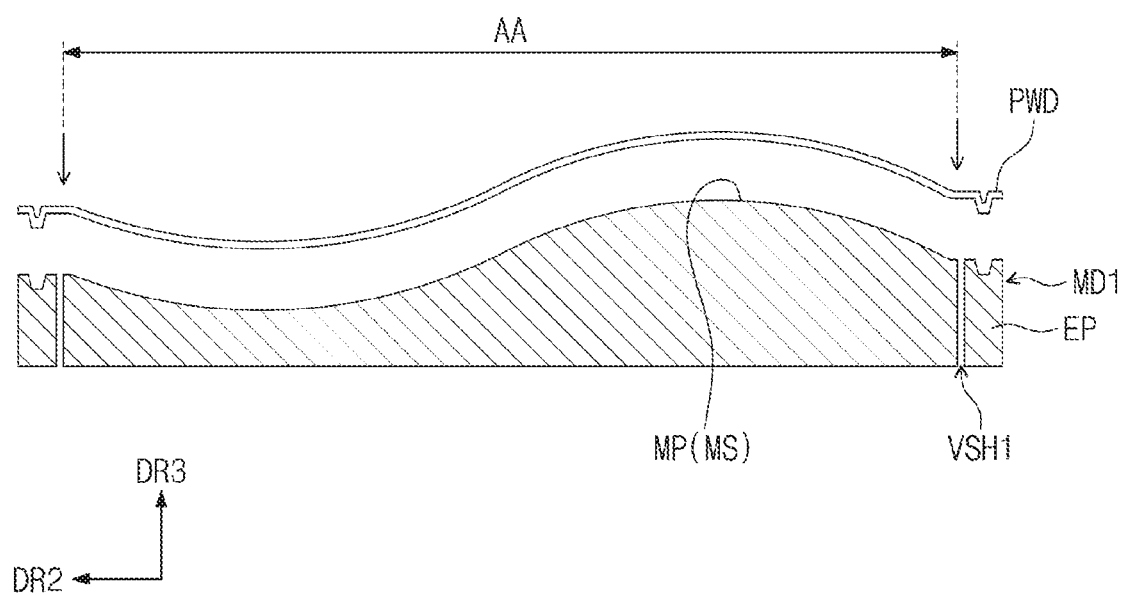

Referring to FIG. 6D, the pressure supply machine PD is separated from the molding machine MD1, and then, the window base material WDM having a changed shape (i.e., a preliminary window PWD) is separated from the molding machine MD1. The separated preliminary window PWD may have a curved surface shape like the shape of the mounting surface MS.

Figure 6E:
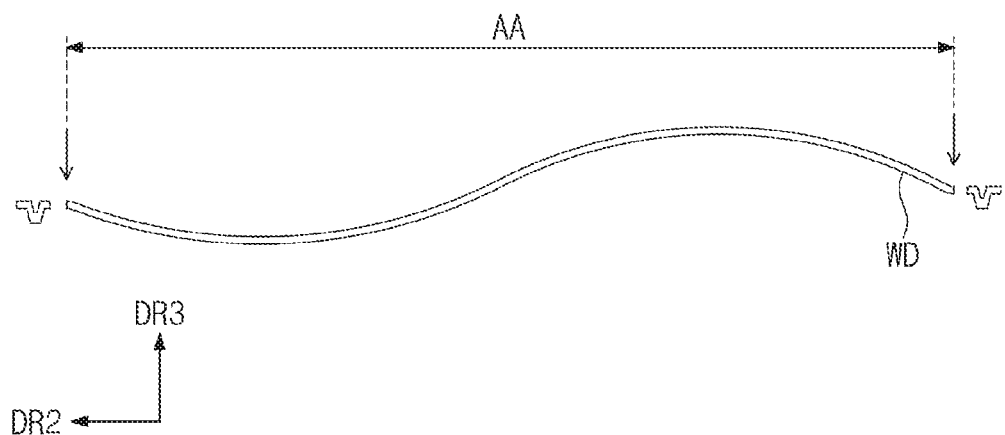

Next, the separated preliminary window PWD may be cut along an effective region AA. Thus, a curved surface-shaped window WD may be completed as shown in FIG. 6E.

Although not shown in the drawings, in the window manufacturing process, a process for forming one of more functional layers on the window WD may be performed after the cutting process. The functional layer may be formed in a method or the like in which a shock absorbing layer for improving shock resistance of the window WD, and a contamination prevention layer or the like for preventing contamination, such as a fingerprint, may be formed by a method, such as adhesion, coating, or deposition.

Figure 7:
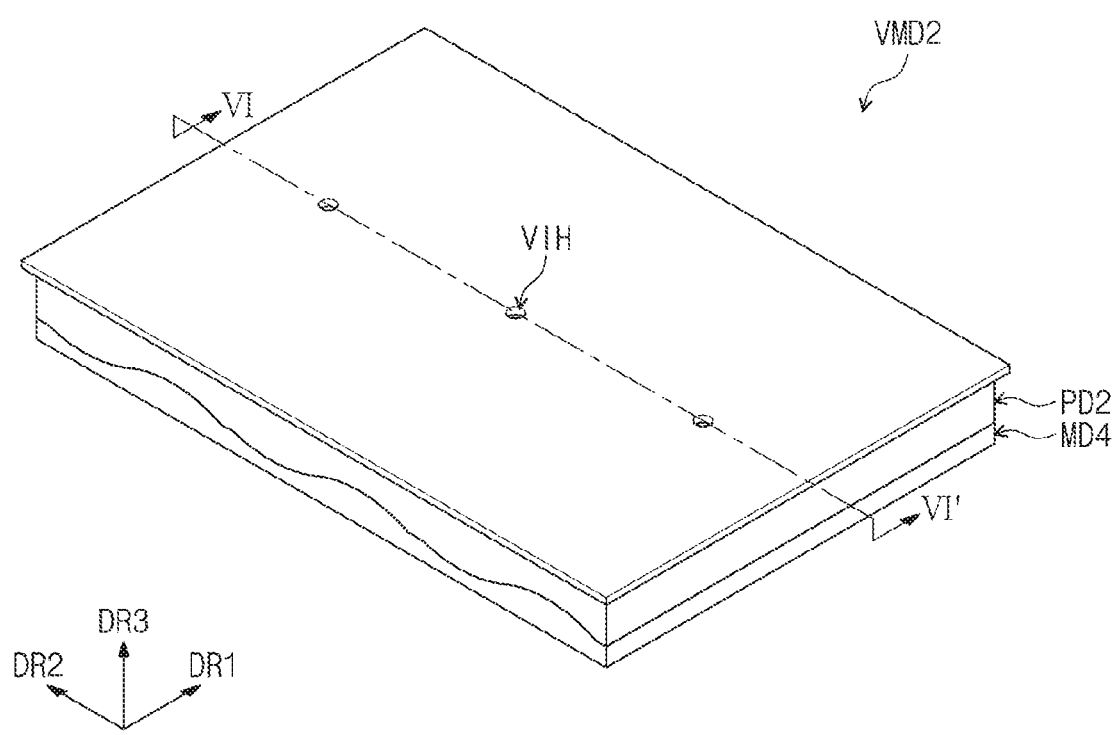
FIG. 7 is a perspective view of a coupled vacuum thermoforming apparatus according to another exemplary embodiment.
Figure 8:
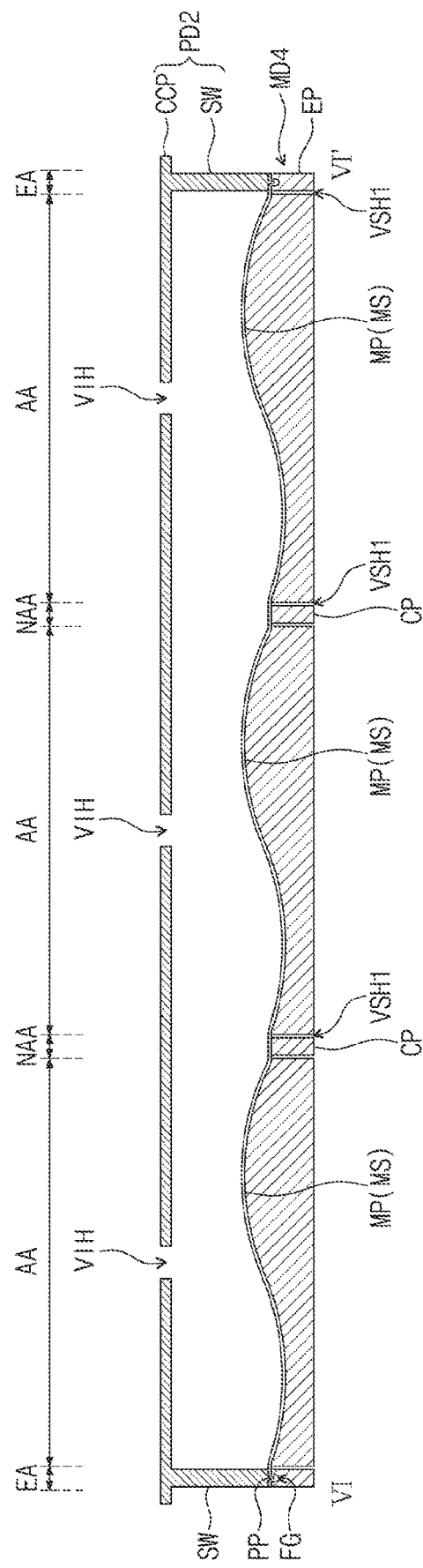
FIG. 8 is a cross-sectional view of the vacuum thermoforming apparatus shown in FIG. 7 taken along cut line VI-VI'.

FIG. 7 is a perspective view of a coupled vacuum thermoforming apparatus according to another exemplary embodiment of the inventive concepts, and FIG. 8 is a cross-sectional view of the vacuum thermoforming apparatus shown in FIG. 7 taken along cut line VI-VI'.

Referring to FIGS. 7 and 8, a vacuum thermoforming apparatus VMD2 according to another exemplary embodiment of the inventive concepts includes: a molding machine MD4 on which a window base material WDM having a plurality of effective regions AA defined therein is mounted; and a pressure supply machine PD2 coupled to the molding machine MD4.

The molding machine MD4 includes: a mounting pat MP having a plurality of mounting surfaces MS corresponding to the plurality of effective regions AA; and a coupling part EP having a structure for coupling with the pressure supply machine PD2. Each of the mounting surfaces MS may have a curved surface shape.

The shapes of the mounting surfaces MS may be the same. However, exemplary embodiments of the inventive concepts are not limited thereto. That is, the mounting surfaces MS may have shapes different from each other.

The molding machine MD4 further includes a connection part CCP provided between two mounting surfaces adjacent to each other among the plurality of mounting surfaces MS. The two mounting surfaces MS adjacent to each other may be connected through the connection part CCP. Here, a non-effective region NAA may be provided between the effective regions AA, and the connection part CCP may be located corresponding to the non-effective region NAA.

The coupling part EP may have a curved surface shape along the shape of the mounting surfaces MS. The coupling part EP of FIG. 8 may have the same structure as the coupling part EP shown in FIGS. 1 to 5A. The coupling part EP includes a fixing groove FG provided in a shape which is recessed a predetermined depth from an upper surface facing the pressure supply machine PD2. Here, a region to which the molding machine MD4 and the pressure supply machine PD2 are substantially coupled through the coupling part EP may be defined as a coupling region EA.

The molding machine MD4 may further include vacuum suction holes VSH1. The vacuum suction holes VSH1 may be provided in any one of the mounting part MP, the connection part CCP, or the coupling part EP. In an exemplary embodiment of the inventive concepts, the vacuum suction holes VSH1 are illustrated to be provided in the coupling part EP and the connection part CCP, but the positions of the vacuum suction holes VSH1 are not limited thereto.

The vacuum suction holes VSH1 are provided in plurality and may be disposed to be spaced apart a predetermined distance from each other. The vacuum suction holes VSH1 are holes for providing a suction force so as to bring the window base material into close contact with the mounting surface MS. Accordingly, in the vacuum thermoforming apparatus VMD2, the window base material WDM may be brought into close contact with and fixed to the mounting surface MS by using a vacuum suction method.

The pressure supply machine PD2 includes: a cover part CP facing the mounting part MP; and a side wall SW extending from the cover part CP. The cover part CP may be provided with a supply hole VIH for supplying a vacuum pressure. In an exemplary embodiment of the inventive concepts, a structure provided with a plurality of supply holes VIH is illustrated. The number of plurality of supply holes VIH is not particularly limited. In an exemplary embodiment of the inventive concepts, each supply hole VIH may be formed in units of one or more effective regions.

The side wall SW extends from the cover part CP and is coupled to the coupling part EP of the molding machine MD4. That is, the side wall SW may be disposed so that the upper surface thereof engages with the coupling part EP. The pressure supply machine PD2 may further include a protrusion part PP protruding from the upper surfaces of the side wall SW. When the pressure supply machine PD and the molding machine MD4 are coupled, the protrusion part PP may be inserted into the fixed groove FG of the coupling part EP. Accordingly, while the pressure supply machine PD2 and the molding machine MD4 are coupled, the pressure supply machine PD2 may be prevented from being easily separated and/or disengaged from the molding machine MD4.

As such, a single window base material WDM is formed by the molding machine MD4 using the vacuum thermoforming apparatus VMD2 provided with a plurality of mounting surfaces MS, so that a plurality of windows may be manufactured by a single forming process.

Figure 9:
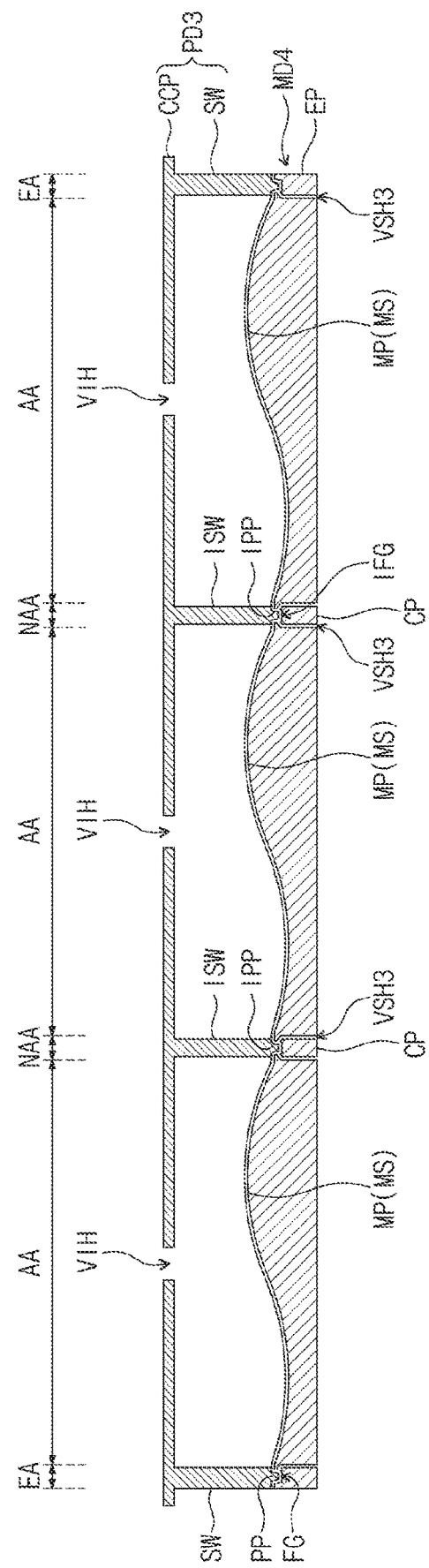
FIG. 9 is a perspective view of a coupled vacuum thermoforming apparatus according to another exemplary embodiment.

FIG. 9 is a perspective view of a vacuum thermoforming apparatus according to another exemplary embodiment of the inventive concepts.

Referring to FIG. 9, in a vacuum thermoforming apparatus according to another exemplary embodiment of the inventive concepts, a pressure supply machine PD3 is provided with an inner side wall ISW provided at a position corresponding to a connection part CCP.

The connection part CCP may be provided with a sub-fixing groove IFG for coupling with the pressure supply machine PD3. That is, the sub-fixing groove IFG may be provided in a shape recessed from an upper surface of the connection part CCP. The pressure supply machine PD3 further includes an inner protrusion part IPP protruding from the upper surface of the inner side wall ISW. Accordingly, when the pressure supply machine PD3 and a molding machine MD4 are coupled, the inner protrusion part IPP may be inserted into the sub-fixing groove IFG.

In the vacuum thermoforming apparatus VMD3 according to the exemplary embodiment of FIG. 9, a vacuum space may be formed in units of effective regions AA by the inner side wall ISW formed by the pressure supply machine. Thus, the pneumatic pressure for each effective region AA may be uniformly adjusted, and consequently, a window having uniform thickness may be manufactured.

Figure 10A:
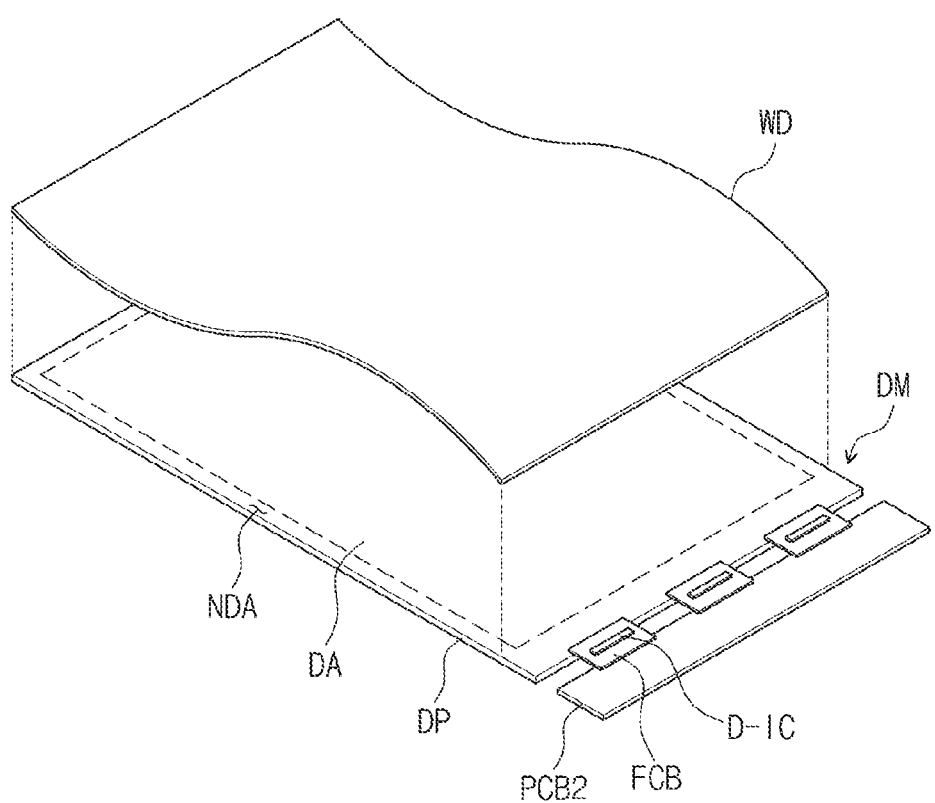
FIGS. 10A and 10B are process views showing a manufacturing process of a display device according to an exemplary embodiment.
Figure 10B:
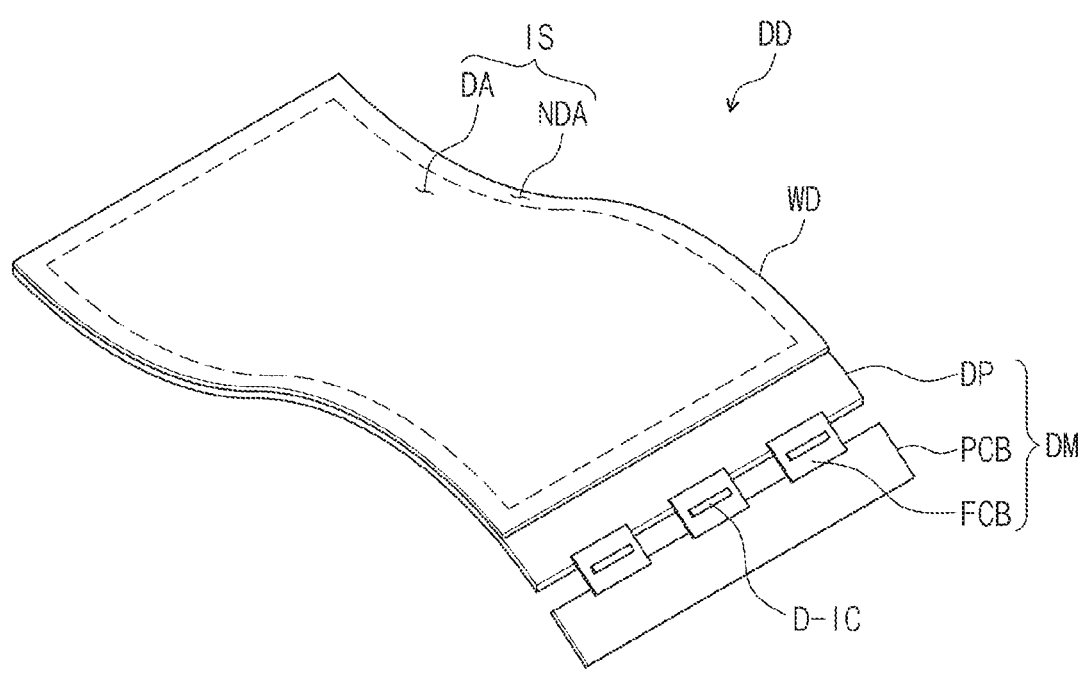

FIGS. 10A and 10B are process views showing a manufacturing process of a display device according to an exemplary embodiment of the inventive concepts.

Referring to FIG. 10A, a window WD manufactured through the above-described manufacturing processes may be disposed corresponding to a display module DM. The window WD may have a curved surface shape. The window WD may have an overall curved surface shape, or a partial curved surface shape at a specific portion (for example, an edge portion). FIG. 10A illustrates that the window has an overall curved structure in an "S" shape, but the shape of the window is not limited thereto.

The display module DM may be a flexible display module having flexibility. Before being coupled to a window WD, the display module DM may have a flat shape. The display module DM may include a display panel DP and a drive module provided on one side of the display panel DP. In the display panel, a display region DA and a non-display region NDA may be defined. The display region DA is a region in which an image is actually displayed, and the non-display region NDA is a region in which no image is displayed. The non-display region NDA may be formed around the display region so as to surround the display region DA.

The drive module may be disposed on one side of the display region DA. The drive module may include a flexible circuit board FCB, a printed circuit board PCB, a drive chip D-IC, and the like. In an exemplary embodiment of the inventive concepts, the flexible circuit board FCB may be attached to the non-display region NDA of the display panel DP, and the drive chip D-IC may be mounted on the flexible circuit board FCB.

However, the configuration and structure of the drive module is not limited thereto. For example, the drive chip D-IC may also be mounted on the non-display region NDA of the display panel DP. In addition, the drive module may be provided with a single flexible film in which a flexible circuit board FCB and a printed circuit board PCB are integrated.

The flexible circuit board FCB is connected to one side of the display panel DP. The flexible circuit board FCB provides the display panel DP. With an electrical signal. The flexible circuit board FCB may generate a signal for controlling an image and a power signal and provide the signals to the display panel DP. A drive element (not shown) may also be mounted on the flexible circuit board FCB and the printed circuit board PCB.

As shown FIG. 10B, the window WD and the display module DM may be coupled. Specifically, one surface of the window WD may be coupled to the upper surface of the display panel DP. Although not shown in the drawings, the window WD and the display panel DP may be coupled through an optical transparent adhesive member.

When the flexible display panel DP is attached to the window WD having a curved surface shape, the shape of the display panel DP is changed according to the shape of the window WD, a display device DD having a curved surface shape may be completed.

Here, the window WD provides a display surface IS on which an image is displayed. The display surface IS may be divided into a display region IS-DA and a non-display region IS-NDA, the display region IS-DA of the display surface IS may correspond to the display region DA (shown in FIG. 10A) of the display panel DP, and the non-display region IS-NDA of the display surface IS may correspond to the non-display region NDA of the display panel DP.

The flexible circuit board FCB is electrically and physically coupled to the display panel DP through an adhesive member (for example, an anisotropic conductive film). The flexible circuit board FCB may include signal lines not shown. The flexible circuit board FCB may be bent toward the rear surface of the display panel DP after being coupled to the display panel DP.

Figure 11:
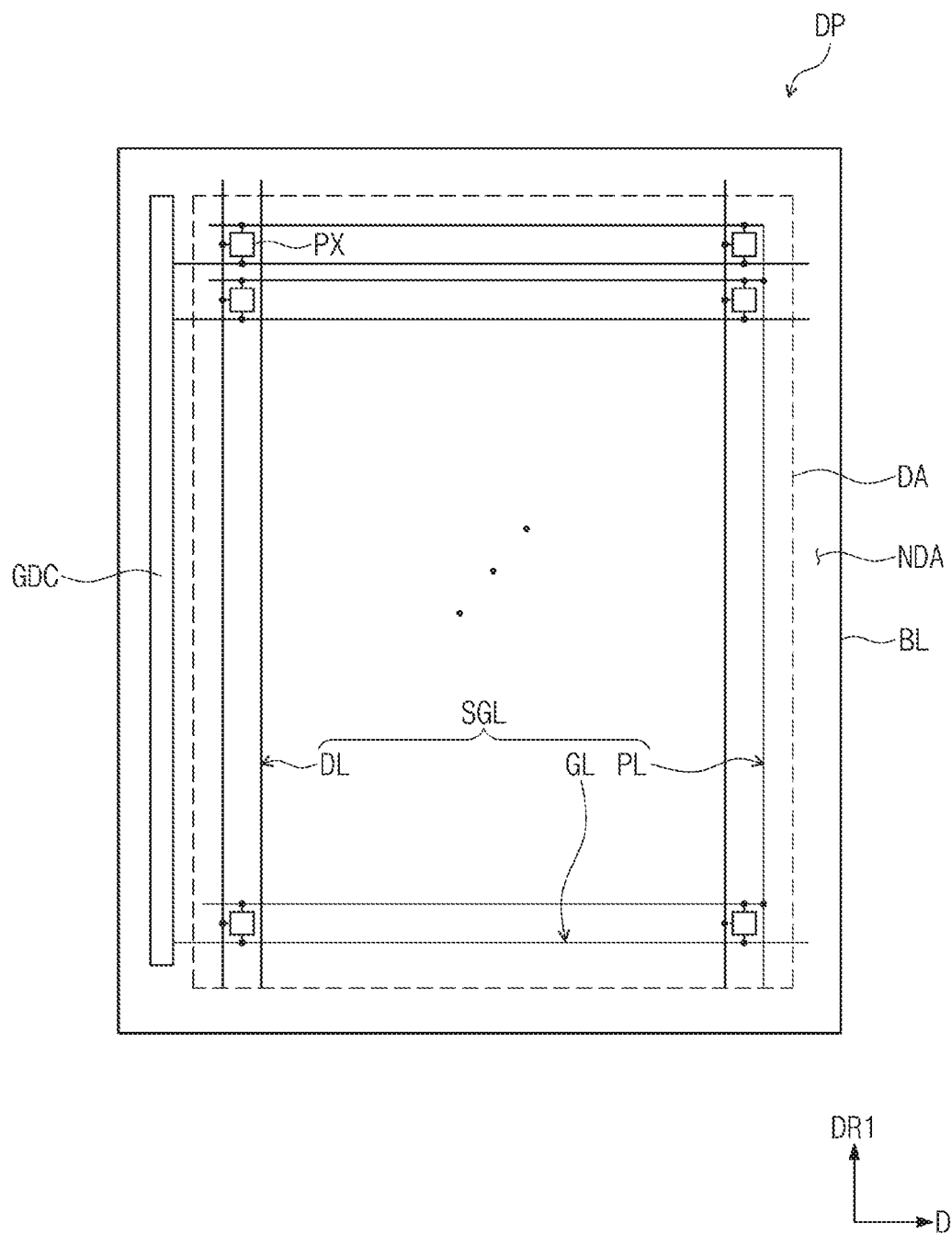
FIG. 11 is a plan view of a display panel shown in FIG. 10A.
Figure 12:
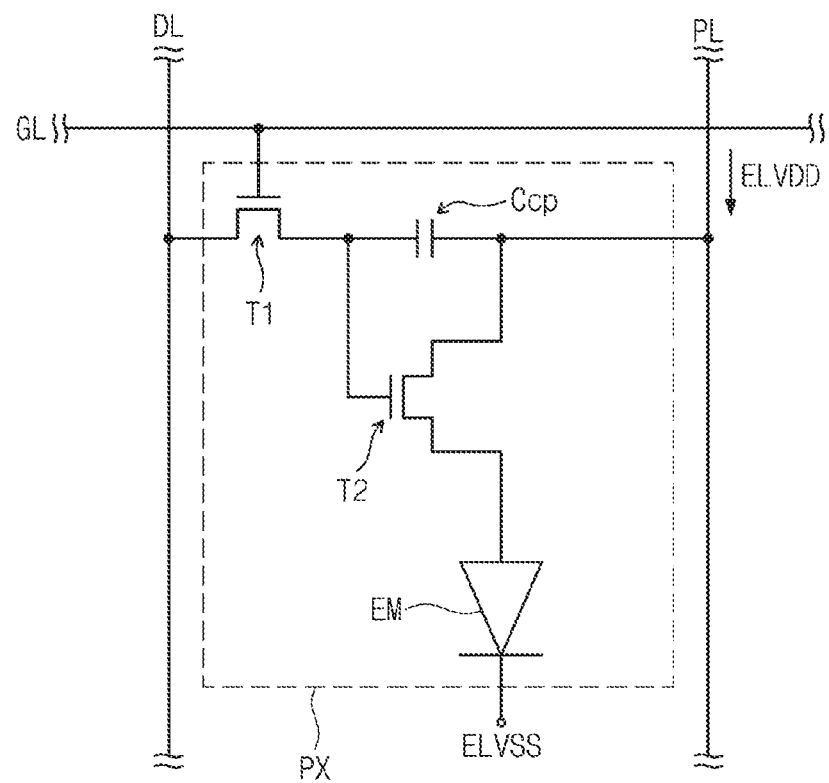
FIG. 12 is an equivalent circuit diagram of a pixel shown in FIG. 11.

FIG. 11 is a plan view of a display panel shown in FIG. 10A, and FIG. 12 is an equivalent circuit diagram of a pixel shown in FIG. 11.

Referring to FIG. 11, the display panel DP includes a base layer BL, a plurality of signal lines SGL, and a plurality of pixels PX. In the present embodiment, for convenience of description, a signal circuit diagram of a single pixel PX is simply illustrated.

The base layer BL is divided into a display region DA and a non-display region NDA when viewed in a plan view. In the present embodiment, the rear surface of the base layer BL may be provided as the rear surface of the display panel DP.

The display region may be a region in which an image is displayed. The display panel DP activates the display region DA in response to an electrical signal. An image IM is displayed on the activated display region IM.

In the non-display region NDA, various signal lines which provide electrical signals to the display region DA, electronic elements, and the like may be disposed. The non-display region NDA may not be viewed from the outside.

A plurality of signal lines SGL, pixels PX, and a plurality of display pads PDD are disposed on a base substrate BS. The signal lines SGL may include a gate line GL, a data line DL. And a power line PL. The gate line GL, the data line DL, and the power line PL may transmit electrical signals different from each other.

The gate line GL extends in a first direction DR1. The gate lines GL may be provided in plurality and be disposed to be spaced apart from each other in a second direction DR2.

The display panel DP is disposed on the base layer BL and may further include a drive circuit GDC which provides an electrical signal to the gate line GL. The drive circuit GDC may include a plurality of thin film transistors which are formed through the same process as a drive circuit of the pixels PX, for example, a low temperature polycrystalline silicon (LTPS) process or a low temperature polycrystalline oxide (LTPO) process.

The data line DL extends in the second direction DR2. The data line DL may be electrically insulated from the gate line GL. The data lines DL may be provided in plurality and be disposed to be spaced apart from each other in the first direction DR1.

The power line PL extends in the first direction DR1. The power line PL may be electrically insulated from the gate lines GL and the data lines DL. The power lines PL may be provided in plurality and disposed to be spaced apart from each other in the first direction DR1, but for convenience of description, a single power line PL is exemplarily illustrated. The power line PL may provide a power signal to the pixels PX.

The pixels PX are disposed in the display region DA. The pixels PX may be provided in plurality and connected to respective corresponding signal lines, but for convenience of description, a single pixel PX is exemplarily illustrated. The pixel PX displays light in response to an electrical signal and implements an image.

Referring to FIG. 12, a pixel PX may include a first thin film transistor T1, a second thin film transistor T2, a capacitor Ccp, and a light-emitting element EM. The first thin film transistor T1, the second thin film transistor T2, the capacitor Ccp, and the light-emitting element EM are electrically connected.

The first thin film transistor T1 may be a switching element which controls the turn on and turn off of the pixel PX. The first thin film transistor T1 is connected to the gate line GL and the data line DL. The first thin film transistor T1 is turned on by a gate signal provided through the gate line GL, and provides the capacitor Ccp with a data signal provided through the data line DL.

The capacitor Ccp charges a voltage corresponding to the potential difference between a first power signal provided from the power line PL and a signal provided from the thin film transistor T1. The second thin film transistor T2 provides the light emitting element EM with a first power signal ELVDD provided from the power line PL corresponding to the voltage charged in the capacitor Ccp.

The light emitting element EM may generate light in response to an electrical signal and control an amount of light. For example, the light emitting element EM may include an organic light emitting element, a quantum dot light emitting element, an electrophoretic element, or electrowetting element.

The light emitting element EM is connected to a power terminal and receives a second power signal ELVSS different from the first power signal ELVDD. A drive current, corresponding to the difference between the electrical signals provided from the second thin film transistor T2 and the second power signal ELVSS, flows through the light-emitting element EM, and the light-emitting element EM may generate light corresponding to the drive current.

Meanwhile, this is exemplarily illustrated, and the pixel PX may include electronic elements having various configurations and arrays, and exemplary embodiments of the inventive concepts are not limited to any one embodiment.

A vacuum thermoforming apparatus according to an exemplary embodiment of the inventive concepts is provided with a molding machine including: a mounting part having a curved surface-shaped mounting surface; and a coupling part provided in a curved shape along the shape of the mounting part. Thus, in manufacturing a window having a curved surface shape, the limitation of uneven thickness of a window base material which may be caused by a difference in the elongation of the window base materials may be solved. Thus, the manufacturing reliability of a curved surface window may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A vacuum thermoforming apparatus comprising:
    a molding machine configured to mount a window base material; and
    a pressure supply machine coupled to the molding machine and configured to supply a pneumatic pressure toward the molding machine,
    wherein the molding machine comprises:
    a mounting part having a mounting surface with a curved surface shape; and
    a coupling part having a structure for coupling with the pressure supply machine and a curved portion along a shape of the mounting part, and
    the pressure supply machine comprises:
    a cover part facing the mounting surface; and
    a side wall extending from the cover part to define an inner space in the pressure supply machine, the side wall comprising a curved upper surface so as to engage with the coupling part.

2. The vacuum thermoforming apparatus of claim 1, wherein the coupling part comprises:
    a facing surface facing the curved upper surface of the side wall; and
    a fixing groove provided in a shape recessed from the facing surface.

3. The vacuum thermoforming apparatus of claim 2, wherein the facing surface has a curved surface shape along the shape of the mounting part.

4. The vacuum thermoforming apparatus of claim 3, wherein a depth of the fixing groove recessed from the facing surface is constant.

5. The vacuum thermoforming apparatus of claim 2, wherein the pressure supply machine further comprises a protrusion part protruding from the curved upper surface of the side wall and configured for insertion into the fixing groove.

6. The vacuum thermoforming apparatus of claim 1, wherein the mounting surface has a shape of an "S" curve.

7. The vacuum thermoforming apparatus of claim 1, wherein the pressure supply machine is provided with a supply hole configured to supply the pneumatic pressure.

8. The vacuum thermoforming apparatus of claim 7, wherein the molding machine is provided with a vacuum suction hole configured for fixing the window base material using a vacuum suction method.

9. The vacuum thermoforming apparatus of claim 8, wherein the vacuum suction hole is provided at least between the coupling part and the mounting part or in the coupling part.

10. The vacuum thermoforming apparatus of claim 1, wherein at least one of the molding machine or the pressure supply machine is made of a metal material.

11. A vacuum thermoforming apparatus comprising:
    a molding machine configured to mount a window base material having a plurality of effective regions defined therein; and
    a pressure supply machine coupled to the molding machine and configured to supply a pneumatic pressure toward the molding machine,
    wherein the molding machine comprises:
    a mounting part having a plurality of mounting surfaces corresponding to the plurality of effective regions, the plurality of mounting surfaces each having a curved surface shape; and
    a coupling part having a structure for coupling with the pressure supply machine and a curved portion along the shape of the mounting part, and
    the pressure supply machine comprises:
    a cover part facing the plurality of mounting surfaces; and
    a side wall extending from the cover part to define an inner space in the pressure supply machine, the side wall comprising a curved upper surface so as to engage with the coupling part.

12. The vacuum thermoforming apparatus of claim 11, wherein the molding machine further comprises a connection part provided between two mounting surfaces adjacent to each other among the plurality of mounting surfaces and configured to connect the two mounting surfaces.

13. The vacuum thermoforming apparatus of claim 12, wherein the connection part is provided with a sub-fixing groove for coupling with the pressure supply machine.

14. The vacuum thermoforming apparatus of claim 13, wherein the pressure supply machine further comprises:
    an inner side wall provided at a position corresponding to the connection part; and
    an inner protrusion part protruding from an upper surface of the inner side wall and coupled to the sub-fixing groove.

15. The vacuum thermoforming apparatus of claim 11, wherein the coupling part comprises:
    a facing surface having a curved surface shape along the shape of the mounting part, and facing the pressure supply machine; and
    a fixing groove provided in a shape recessed a constant depth from the facing surface.

16. The vacuum thermoforming apparatus of claim 11, wherein the pressure supply machine is provided with a supply hole configured to supply the pneumatic pressure, and the supply hole is provided corresponding to one or more effective regions.

17. The vacuum thermoforming apparatus of claim 11, wherein the molding machine further comprises a vacuum suction hole configured for fixing the window base material using a vacuum suction method.

18. A method for manufacturing a display device using a vacuum thermoforming apparatus including a molding machine comprising a mounting part having a mounting surface with a curved surface shape and a coupling part provided in a curved shape along a shape of the mounting part; and a pressure supply machine coupled to the molding machine, the method comprising:

heating a window base material;

mounting the heated window base material on the mounting part;

coupling the pressure supply machine and the molding machine;

supplying a pneumatic pressure toward the mounting part through the pressure supply machine to bring the window base material into close contact with the mounting surface and deforming a shape of the window base material into the curved surface shape of the mounting surface;

cutting the deformed window base material along an effective region and completing a window having a curved surface shape;

manufacturing a flexible display module; and attaching the flexible display module to the window and completing the display device.

19. The method of claim 18, wherein the heating of the window base material comprises:

clamping the window base material by using a clamping device; and heating the window base material through the clamping device.

20. The method of claim 19, wherein the clamping device mounts the heated window base material onto the mounting part.

21. The method of claim 18, further comprising preheating the mounting part.

22. The method of claim 18, wherein in the deforming the shape of the window base material, the window base material is vacuum suctioned using a vacuum suction hole provided in the molding machine and brings the window base material into close contact with the mounting surface.

23. The method of claim 18, wherein the window base material is made of a plastic material.

\* \* \* \* \*